United States Patent [19]
Hollins

[11] 3,990,602
[45] Nov. 9, 1976

[54] SIPHON-PROOF FUEL TANK

[76] Inventor: Jesse R. Hollins, 40 Stoner Ave., Great Neck, N.Y. 11021

[22] Filed: Feb. 13, 1974

[21] Appl. No.: 441,944

[52] U.S. Cl. ............................ 220/86 AT; 220/72
[51] Int. Cl.² ........................................ B67C 3/00
[58] Field of Search ........................ 220/86 AT, 72

[56] References Cited
UNITED STATES PATENTS

| | | | |
|---|---|---|---|
| 1,813,554 | 7/1931 | Wickline | 220/86 AT |
| 1,999,336 | 4/1935 | McGillicuddy et al. | 220/86 AT |
| 2,038,676 | 4/1936 | Readeker | 220/86 AT |
| 2,050,793 | 8/1936 | Hille | 220/86 AT |
| 2,052,782 | 9/1936 | Mann | 220/86 AT |
| 2,870,981 | 1/1959 | Dellinger | 220/72 |
| 2,918,379 | 12/1959 | Lurie | 220/72 |
| 2,936,986 | 5/1960 | Johnson | 220/72 |

Primary Examiner—William T. Dixson, Jr.
Assistant Examiner—Allan W. Shoap
Attorney, Agent, or Firm—Kirschstein, Kirschstein, Ottinger & Frank

[57] ABSTRACT

A fuel tank consisting of a housing in which a port is located. A fuel fill tube is connected to said housing. A barrier is located beneath said port to prevent the insertion of a siphon tube into said fuel tank.

1 Claim, 6 Drawing Figures

SIPHON-PROOF FUEL TANK

BACKGROUND OF THE INVENTION

1. Field of the Invention

Siphon-proof fuel tank for motor vehicles.

2. Description of the Prior Art

With the Arab oil embargo following the 1973 Arab-Israeli War the American motorist is now facing an acute fuel shortage. Long lines at gas stations for reduced amounts of fuel (gasoline) at higher prices are not commonplace. This problem of course is not unique to the United States as many other countries are also facing fuel shortages.

As a result of fuel shortages there has been an increase in the illicit removal of fuel from parked motor vehicles. Usually this is done by removing the cap for the motor vehicle fuel tank and inserting a siphon tube through the fuel tank fill tube into the fuel tank so that the fuel in the fuel tank can be siphoned.

As a deterrent to the illicit removal by siphoning of fuel from a motor vehicle fuel tank many people are utilizing lock caps, i.e. caps which include a lock.

While the idea of a lock cap is a theoretically good one it is relatively simple to forcibly remove a lock cap so that the fuel in the fuel tank can be illicitly siphoned.

A key to remove the cap is necessary which must be available if fuel is to be added to the fuel tank. If more than one driver operates the motor vehicle each operator must have at his disposal the key when additional fuel for the motor vehicle is required. If the operator does not have a key it is not possible to add fuel to the fuel tank.

SUMMARY OF THE INVENTION

1. Purposes of the Invention

It is an object of the present invention to provide improved apparatus to prevent the siphoning of fuel from a motor vehicle fuel tank.

Another object of the present invention is to provide a tamper-proof apparatus to prevent the siphoning of fuel from a motor vehicle fuel tank.

Still another object of the present invention is to provide a tamper-proof apparatus for preventing the siphoning of fuel from a motor vehicle fuel tank which is inexpensive in fabrication.

A further object of the present invention is to provide a tamper-proof apparatus for preventing siphoning of fuel from a motor vehicle fuel tank which is simple to install within said tank.

Other objects of the invention in part will be obvious and in part will hereinafter be pointed out.

2. Brief Description of the Present Invention

According to the present invention, the foregoing and other objects are accomplished by having barrier located inside a motor vehicle fuel tank. The barrier is directly beneath the port at the bottom of the fuel fill tube but is spaced therefrom. The barrier has greater planer area than the port.

When it is desired to add fuel to the fuel tank the cap on the fill tube is removed and fuel is pumped into the fill tube and into the tank. The fuel impinges on the upper surface of the barrier and spills over the free edges thereof into the fuel tank. The cap is then affixed to the fuel fill tube.

If the cap is removed and a siphon tube is inserted through the fuel fill tube the siphon tube will abut the barrier and will not be able to be further inserted in the tank. Inasmuch as the barrier is slightly below the port at the bottom of the fuel fill tube the siphon will not be able to be inserted sufficiently into the interior of the fuel tank to remove fuel. When the tank is completely filled there may be a small amount of fuel on the barrier which can be siphoned off by the siphon tube but this will be an insignificant amount. The barrier is wide enough so that even if the siphon tube is flexible a person will not be able to force the siphon tube through the fuel fill tube and over a free edge of the barrier into the center of the fuel tank.

The invention accordingly consists in the features of construction, combination of elements and arrangement of parts which will be exemplified in the device hereinafter described and of which the scope of application will be indicated in the appended claims.

DESCRIPTION OF THE PREFERRED EMBODIMENTS

Figure 1:
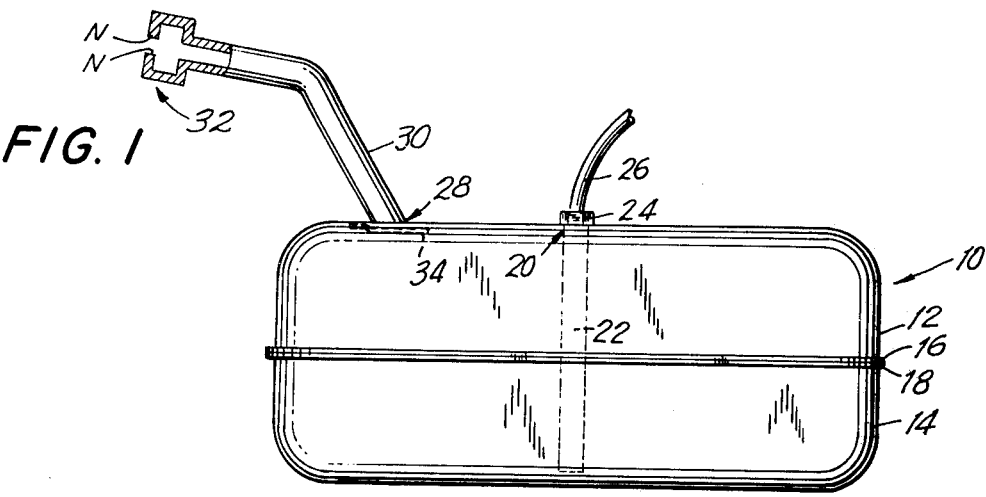
FIG. 1 is a side plan view of a motor vehicle fuel tank utilizing a barrier according to the present invention.
Figure 2:
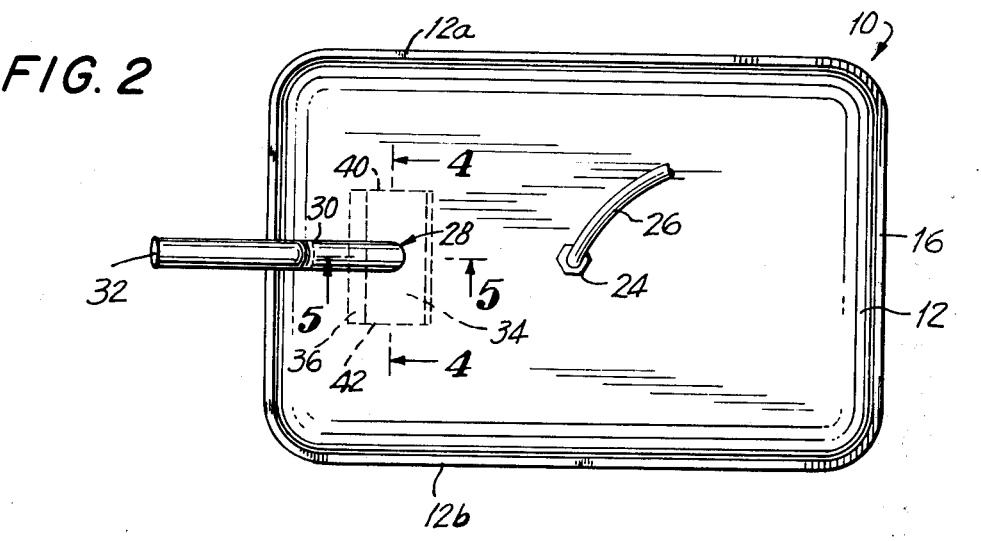
FIG. 2 is a top plan view of the motor vehicle fuel tank of FIG. 1.
Figure 3:
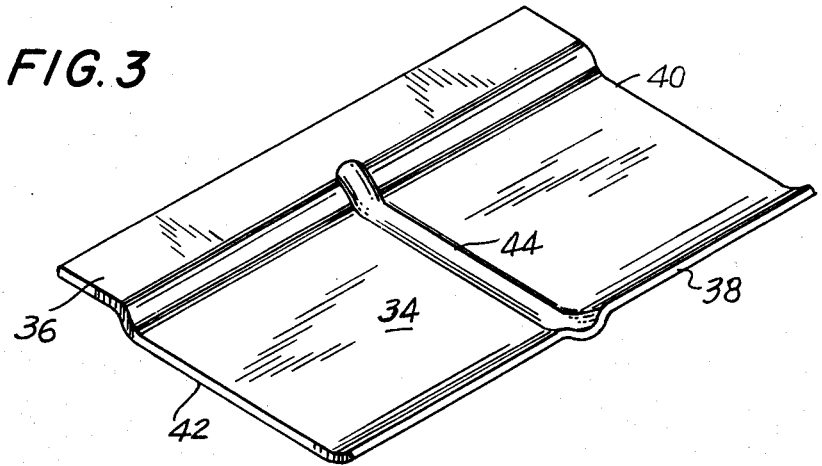
FIG. 3 is a perspective view of the barrier of FIGS. 1, 2 and 3.
Figure 4:
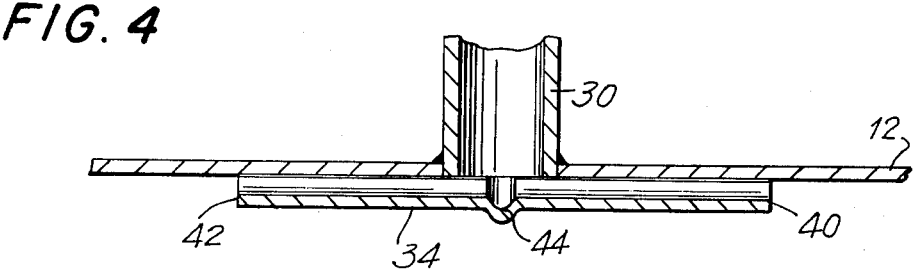
FIG. 4 is an enlarged sectional view taken substantially along the line 4—4 of FIG. 2.

Referring now to the drawings, a motor vehicle fuel tank 10 is shown which is conventional in design. Fuel tank 10 is formed from an upper shell 12 and a lower mating shell 14. A perimetral flange 16 is located on the bottom portion of upper shell 16. A further perimetral flange 18 is located on the upper portion of bottom shell 14. Perimetral flanges 14 and 16 mate with each other and seal the interior of the fuel tank in the conventional manner making the tank leakproof.

A hole 20 extends through the upper portion of upper shell 12 and extending through said hole into the interior of fuel tank 10 is a tube 22. A nut 24 abuts the outside surface of upper shell 12 and secures said tube to a suction line 26 which leads to the motor vehicle engine fuel pump. As will be apparent to those skilled in the art the structure heretofore described is conventional and can be found on motor vehicles now commercially made.

Extending through the upper portion of upper shell 12 is a port 28. Secured to upper shell 12 and in fluid communication with port 28 is a fuel tube 30. Located at the end of fuel fill tube 30 is a flange 32 having opposed notches therein so as to enable a cap to be secured thereto. Located beneath port 28 and spanning said port is a barrier 34. Barrier 34, in the embodiment shown in FIGS. 1 through 4 includes opposed parallel ends 36 and 38. End 36, which is substantially flat, is secured to upper shell 12 by any conventional means, e.g. spot welding if the barrier is made from a metal product. End 38 is curled and abuts the fuel tank. It is noted that barrier 34 is substantially wider than port 28 and includes lateral edges 40 and 42 which flank port 28. If desired a reinforcing rib (or ribs) 44 can extend through barrier 34 to provide structural rigidity. It is noted that lateral edges 40 and 42 are spaced from the vertical walls 12a and 12b of upper shell 12. Barrier 34 can have a central depression if desired as shown. Barrier 34 is immediately below port 28 but spaced therefrom.

It is to be appreciated that the barrier is placed in the aforedescribed location prior to securing upper shell 12 to lower shell 14.

When it is desired to add fuel to fuel tank 10 a pump nozzle is inserted into fill tube 30 and the fuel is directed through said fill tube. The fuel spills over the barrier into the interior of fuel tank 10.

After fuel has been transferred to the interior of fuel tank 10, the locking cap is applied to the end of fill tube 30.

If the cap which is secured to the end of fill tube 30 is removed and a siphon tube inserted through said fill tube, the siphon tube will abut barrier 34 which abutment will prevent the insertion of said siphon tube into the interior of the fuel tank. Consequently, it is not possible to siphon gas from the fuel tank. The only fuel which can be siphoned is the fuel which is on top of barrier 34 and in any event this is a relatively miniscule amount. The barrier is wide enough so that even if the siphon tube is flexible it is not possible by forcing the siphon tube through port 30 to pass the siphon tube past the barrier.

Figure 5:
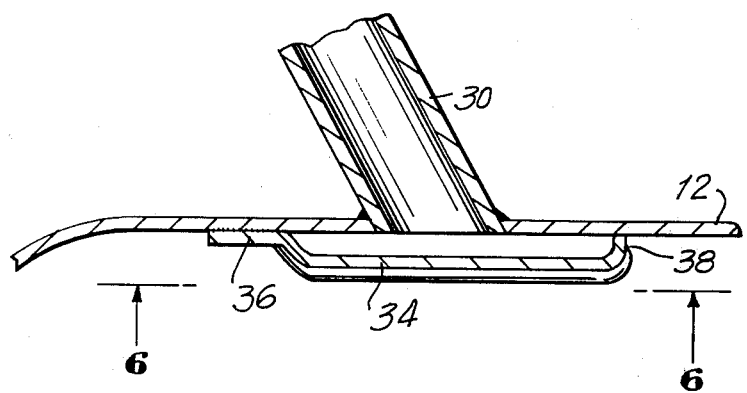
FIG. 5 is a sectional view of an alternate embodiment of the present invention.
Figure 6:
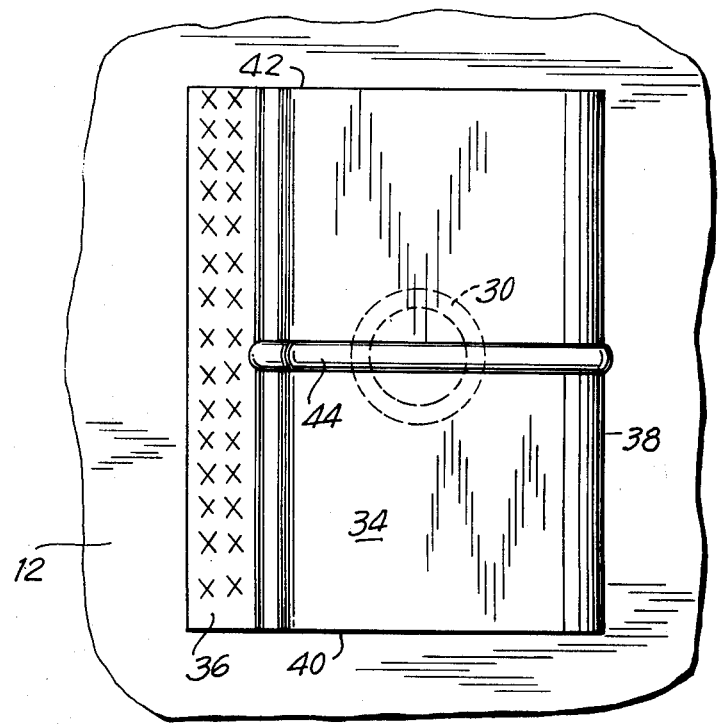
FIG. 6 is an enlarged sectional view taken substantially along the line 6—6 of FIG. 5.

In the embodiment shown in FIGS. 5 and 6, one end (the left end of FIGS. 5 and 6) of barrier 34 is secured to upper shell 12 and the other end thereof is spaced from said upper shell. The barrier in the latter embodiment functions in the same way as the barrier heretofore described and includes a central stiffening rib.

If desired the barrier need not be constructed from a metallic material. Still further, the barrier can be secured to the upper shell by techniques such as crimping, etc.

The shape of the barrier can be varied as desired.

If desired the barrier may be perforated in those instances wherein the fill tube is shaped in a manner so that a rigid instrument cannot be inserted through the fill tube and reach the barrier. The perforations will allow an extremely fast flow of fuel into the tank. Care must be taken so that the perforations are not large enough to allow a flexible siphon tube to be inserted therethrough.

It thus will be seen that there is provided a siphon-proof fuel tank which achieves the various objects of the invention and which is well adapted to meet the conditions of practical use.

As various possible embodiments might be made of the above invention, and as various changes might be made in the embodiments set forth, it is to be understood that all matter herein described or shown in the accompanying drawings is to be interpreted as illustrative and not in a limiting sense.

Having thus described the invention, there is claimed as new and desired to be secured by Letters Patent:

1. An apparatus for preventing the siphoning of fuel from a fuel tank of a motor vehicle, said fuel tank including an upper shell having a rectangular shaped flat upper portion provided with an inner and an outer surface and having vertical side walls extending therefrom having bottom edges with a first perimetral flange located on said bottom edges, and a lower mating shell having a flat lower portion with vertical side walls extending therefrom having upper edges with a second perimetral flange located on their upper edges, said first and second perimetral flanges adapted to mate with each other when said upper and lower shells are brought together and seal the interior of said fuel tank to make said fuel tank leak proof, said flat upper portion of said upper shell being provided with a hole therethrough, a tube extending through said hole into the interior of said fuel tank, a nut abutting the outside surface of said upper shell, a suction line secured to said tube by said nut which leads to a fuel pump, said fuel tank being emptied when said fuel pump is in operation, a port through said flat upper portion of said upper shell, a fuel fill tube having one end in fluid communication with said port, said fuel fill tube having at its opposite end a flange provided with opposing notches, a cap adapted to cooperate with said flange and notches to seal off said fuel fill tube, and a barrier positioned in the interior of said fuel tank beneath and adjacent said inner surface of said flat upper portion spanning said port, said barrier having at least one retaining rib extending through said barrier to provide structural rigidity, said barrier having opposed parallel ends and opposed parallel lateral edges, said parallel ends being longer than said lateral edges, one of said parallel ends being substantially flat and conforming to the shape of said inner surface of said upper shell to form a surface extending the width of said barrier which contacts said inner surface to allow said barrier to be mounted to said inner surface, the other of said parallel ends being curled and abutting said inner surface of said upper shell, said parallel lateral edges flanking said port, and being positioned from said vertical side walls of said upper shell to create a space therebetween, so that when fuel is introduced into said fuel tank through said fuel fill tube and said port, said fuel strikes said barrier and spills over said lateral edges through said space between said lateral edges and said vertical side walls into said fuel tank, said barrier having a width between said lateral edges greater than the diameter of said port so that said lateral edges are spaced from said port a distance sufficient to prevent the insertion of a siphon tube through said fuel fill tube past said barrier and into said fuel tank.

* * * * *